United States Patent
Ben Lagha et al.

(10) Patent No.: US 11,981,237 B2
(45) Date of Patent: May 14, 2024

(54) PADDING FOR A MOTOR VEHICLE SEAT

(71) Applicant: TESCA FRANCE, Paris la Défense (FR)

(72) Inventors: Mohamed Ben Lagha, Paris (FR); Santi Sanchez, Paris (FR); Christine Tonellato, Paris (FR)

(73) Assignee: TESCA FRANCE, Paris la Défense (FR)

( * ) Notice: Subject to any disclaimer, the term of this patent is extended or adjusted under 35 U.S.C. 154(b) by 217 days.

(21) Appl. No.: 17/283,290

(22) PCT Filed: Oct. 9, 2019

(86) PCT No.: PCT/EP2019/077259
§ 371 (c)(1),
(2) Date: Sep. 27, 2021

(87) PCT Pub. No.: WO2020/074537
PCT Pub. Date: Apr. 16, 2020

(65) Prior Publication Data
US 2023/0023502 A1 Jan. 26, 2023

(30) Foreign Application Priority Data
Oct. 9, 2018 (FR) ...................................... 1859350

(51) Int. Cl.
*B60N 2/58* (2006.01)
*B32B 5/02* (2006.01)
(Continued)

(52) U.S. Cl.
CPC .................. *B60N 2/70* (2013.01); *B32B 5/02* (2013.01); *B32B 5/26* (2013.01); *B32B 7/12* (2013.01);
(Continued)

(58) Field of Classification Search
CPC . B60N 2/00; B60N 2/002; B60N 2/58; B64D 11/0607; B64D 11/0647
See application file for complete search history.

(56) References Cited

U.S. PATENT DOCUMENTS

| | | | |
|---|---|---|---|
| 7,164,117 B2 * | 1/2007 | Breed | B60N 2/002 250/221 |
| 7,421,321 B2 * | 9/2008 | Breed | G02B 27/01 340/447 |
| 7,555,370 B2 * | 6/2009 | Breed | B60R 21/30 701/32.7 |
| 7,603,894 B2 * | 10/2009 | Breed | B60C 23/0413 73/146 |

(Continued)

FOREIGN PATENT DOCUMENTS

| | | |
|---|---|---|
| EP | 2682724 A1 | 1/2014 |
| FR | 2848930 A1 | 6/2004 |
| FR | 3058369 A1 | 5/2018 |

OTHER PUBLICATIONS

International Search Report issued in corresponding application No. PCT/EP2019/077259 dated Jan. 16, 2020.

*Primary Examiner* — Rodney B White
(74) *Attorney, Agent, or Firm* — Murtha Cullina LLP

(57) ABSTRACT

The invention relates to a padding for a motor vehicle seat having a sheet for measuring multizone pressure. The sheet has a flexible support layer, with a first electrode having first contact elements, a second electrode having second contact elements and a plurality of intermediate contact elements having piezoresistive properties, each of the intermediate elements being inserted between a first and a second element to form a plurality of pressure sensors. The support layer is made of mesh. The first electrode is made from conductive ink printed on the support layer. The second electrode is made from printed conductive ink, and the intermediate contact elements are made from printed conductive ink with less conductivity than the inks of the electrodes.

8 Claims, 2 Drawing Sheets

(51) Int. Cl.
  *B32B 5/26* (2006.01)
  *B32B 7/12* (2006.01)
  *B60N 2/70* (2006.01)
  *B32B 5/18* (2006.01)
  *B32B 5/24* (2006.01)
  *B32B 9/02* (2006.01)
  *B32B 9/04* (2006.01)

(52) U.S. Cl.
  CPC ............. *B32B 5/18* (2013.01); *B32B 5/245* (2013.01); *B32B 9/025* (2013.01); *B32B 9/046* (2013.01); *B32B 2255/02* (2013.01); *B32B 2255/26* (2013.01); *B32B 2262/0261* (2013.01); *B32B 2262/0276* (2013.01); *B32B 2307/546* (2013.01); *B32B 2307/718* (2013.01); *B32B 2601/00* (2013.01)

(56) References Cited

U.S. PATENT DOCUMENTS

| | | | | |
|---|---|---|---|---|
| 7,663,502 | B2* | 2/2010 | Breed | B60R 25/25 340/7.29 |
| 7,920,102 | B2* | 4/2011 | Breed | B60K 37/06 340/991 |
| 8,019,501 | B2* | 9/2011 | Breed | B62D 21/15 701/31.9 |
| 8,169,311 | B1* | 5/2012 | Breed | G06V 20/59 340/539.22 |
| 8,849,502 | B2* | 9/2014 | Hiemenz | B60N 2/002 701/33.4 |
| 10,449,874 | B2* | 10/2019 | Sugiyama | B60N 2/5816 |
| 10,667,755 | B2* | 6/2020 | Ridao Granado | B60N 2/90 |
| 11,007,902 | B2* | 5/2021 | Sugiyama | B60N 2/5816 |
| 2017/0305301 | A1* | 10/2017 | McMillen | B60N 2/002 |
| 2022/0177162 | A1* | 6/2022 | Hessenberger | B60N 2/70 |

* cited by examiner

PADDING FOR A MOTOR VEHICLE SEAT

CROSS-REFERENCE TO RELATED APPLICATIONS

This application claims the benefit of International application number PCT/EP2019/077259, filed Oct. 8, 2019 and French application number 1859350, filed Oct. 9, 2018 the entire contents of which are incorporated herein by reference.

TECHNICAL FIELD

The invention relates to padding for a motor vehicle seat.

BACKGROUND

Producing padding for a motor vehicle seat is known, said padding comprising, disposed successively one on the other:
- a cover upholstering said padding, said cover having an area for receiving a passenger,
- a sheet for measuring multizone pressure, said sheet extending facing the whole of said area, said sheet comprising means for connection to an electronic system for measuring the pressure exerted by an occupant of said padding at various zones of said area, said sheet comprising:
  - a flexible support layer,
  - a first electrode comprising a plurality of first current-conduction lines, each of said lines having a first end forming a first contact element,
  - a second electrode overlapping said first electrode, said second electrode comprising a plurality of second current-conduction lines, each of said lines having a second end forming a second contact element, each first element being disposed facing a respective second element,
  - a plurality of intermediate contact elements having piezoresistive properties, each of said intermediate elements being inserted between a respective first and second element so as to form a plurality of pressure sensors formed by the stack of said contact elements, said sensors being distributed over said support layer in a discrete manner,
- an elastically compressible stuffing block.

It is stated here that piezoresistivity relates to the ability of a material to have the electrical resistance thereof vary when a mechanical force is applied thereto, in this case here in the form of a compression made by an occupant bearing on the padding.

The use of such padding makes it possible, by means of the electronic pressure-measuring system, to implement a "mapping" of the positioning of the occupant of said padding, in this case of the distribution of his weight, and therefore to make it possible for example to adjust said padding taking account of the build and position of said occupant—for example by localised swelling of said padding in zones where there is less bearing.

Using a support layer in the form of a plastic or nonwoven sheet is known.

However, the presence of such a support layer may contribute to stiffening the padding and therefore impairing the comfort thereof when pressed down.

Furthermore, the support layer, when it is impervious, as it is the case when it is in the form of a plastic sheet, impairs the hygrothermal comfort of the padding.

SUMMARY OF THE INVENTION

The aim of the invention is to overcome these drawbacks.

To this end, the invention proposes padding for a motor vehicle seat, said padding comprising, disposed successively one on the other:
- a cover upholstering said padding, said cover having an area for receiving a passenger,
- a sheet for measuring multizone pressure, said sheet extending facing the whole of said area, said sheet comprising means for connection to an electronic system for measuring the pressure exerted by an occupant of said padding at various zones of said area, said sheet comprising:
  - a flexible support layer,
  - a first electrode comprising a plurality of first current-conduction lines, each of said lines having a first end forming a first contact element,
  - a second electrode overlapping said first electrode, said second electrode comprising a plurality of second current-conduction lines, each of said lines having a second end forming a second contact element, each first element being disposed facing a respective second element,
  - a plurality of intermediate contact elements having piezoresistive properties, each of said intermediate elements being inserted between a respective first and second element so as to form a plurality of pressure sensors formed by the stack of said contact elements, said sensors being distributed over said support layer in a discrete manner,
- an elastically compressible stuffing block, said padding furthermore having the following features:
- said support layer is made of mesh,
- said first electrode is made from conductive ink printed on said support layer,
- said second electrode is made from printed conductive ink,
- said intermediate contact elements are made from printed conductive ink with less conductivity than that of the inks of said electrodes.

It is stated here that a conductive ink comprises a polymer matrix wherein conductive particles are dispersed.

Such an ink is printed in particular by screen printing or by ink jet.

It is reminded here (with reference to the work "Le dictionnaire des textiles (Dictionary of textiles)—Maggy Baum and Chantal Boyeldieu—published by Editions de l'Industrie Textile—2002) that the definition of a mesh is:

"Fundamental element constituting a textile surface including a more or less loose lattice of threads interlaced by one loop of thread through another. Elementary unit of textiles fashioned as knitwear, crochet, lace, tulle, net. Each mesh encloses one or more loops of thread joined differently from one another according to the technique used. By modifying the characteristics of the mesh, new weaves, other reliefs, are obtained or created.

Parts of the mesh: every mesh is composed of:
a head: top part forming the semicircle of the needle loop;
two wings or legs: narrow parts of the mesh (lateral parts) connecting the head and the feet;
two feet: curved bottom part of the mesh."

N.B.: These various parts are shown in FIG. 4 presented below.

It is stated here that, throughout the description, a meshed layer designates a layer formed by a lattice of elementary units as described above.

With the proposed arrangement:
- the support layer, through the nature thereof as a mesh, is highly extensible; given that the ink is also extensible, the support layer does not contribute to stiffening the padding,
- the fact that the support layer is porous makes it possible not to impair the hygrothermal comfort of the padding.

BRIEF DESCRIPTION OF THE DRAWINGS

Other particularities and advantages of the invention will emerge in the following description, made with reference to the accompanying figures, wherein.

DETAILED DESCRIPTION

Figure 1:
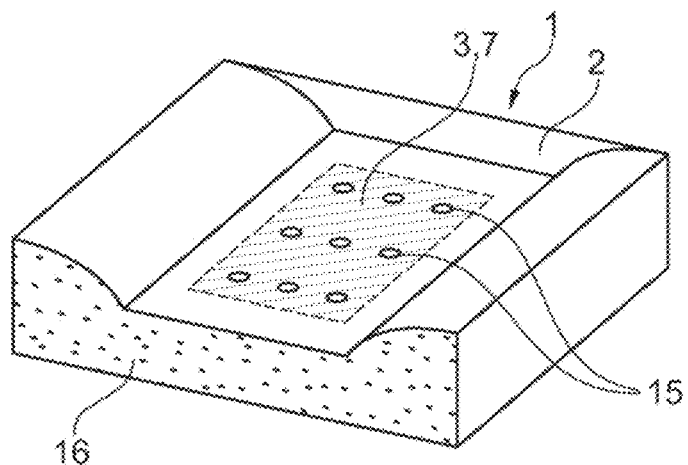
FIG. 1 is a schematic perspective view of padding provided with a pressure-measuring sheet according to the invention.
Figure 2A:
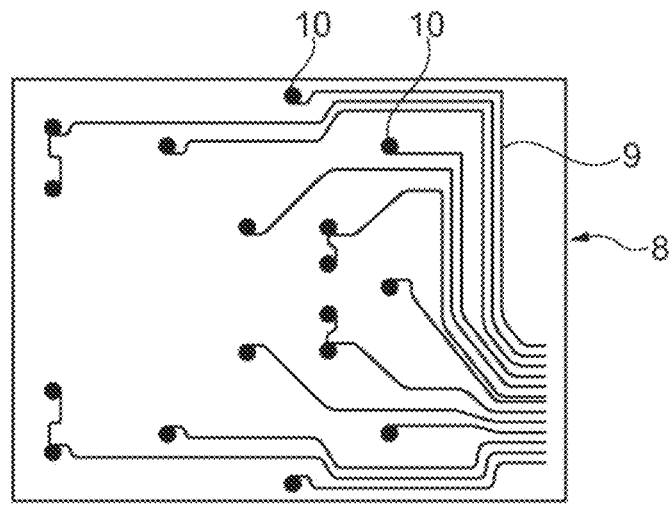
FIGS. 2a, 2b and 2c are schematic front views, according to one embodiment, of a first electrode (FIG. 2a), intermediate contact elements (FIG. 2b) and a second electrode (FIG. 2c)
Figure 2B:
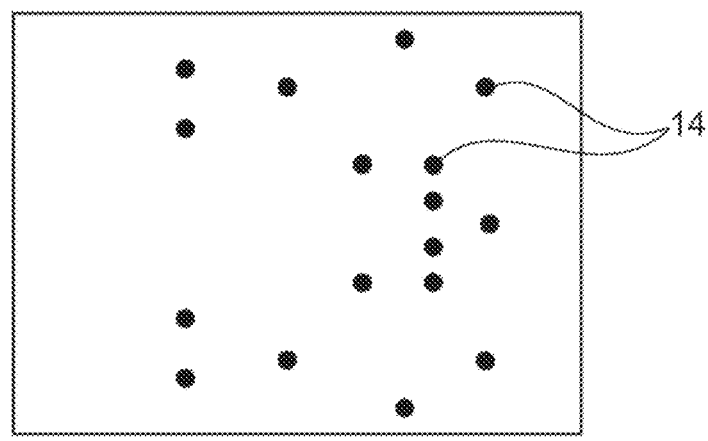
Figure 2C:
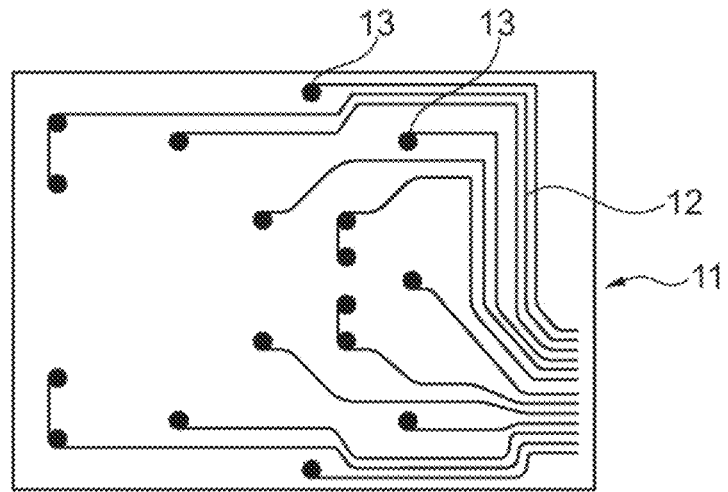
Figure 3:
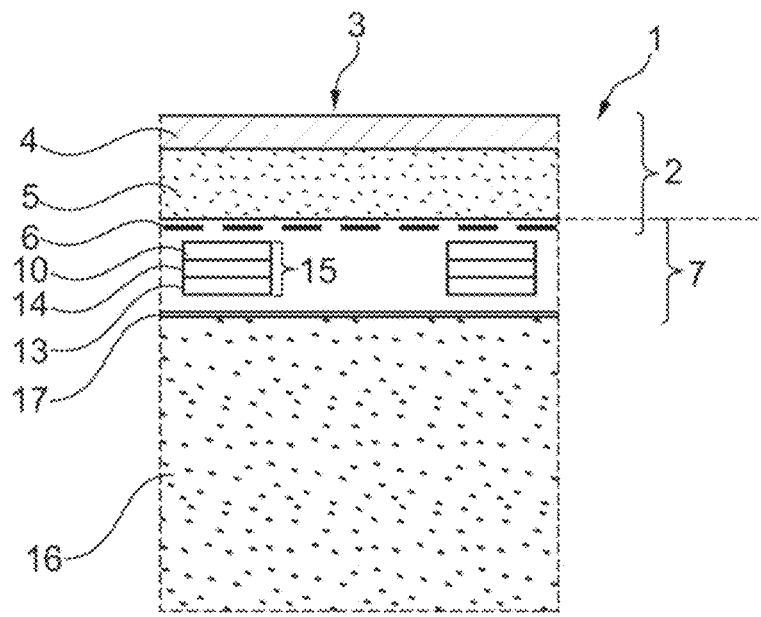
FIG. 3 is a schematic view in partial cross section of padding provided with a measuring sheet according to one embodiment.
Figure 4:
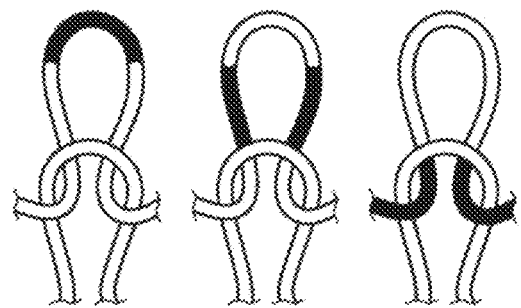
FIG. 4 is a schematic representation of a mesh shown in three images, the parts highlighted in black representing the head (left figure), the two wings or legs (central figure) and the two feet (right figure).

With reference to the figures, padding 1 for a motor vehicle seat is described, said padding comprising, disposed successively one on the other:
- a cover 2 upholstering said padding, said cover having an area 3 for receiving a passenger,
- a sheet 7 for measuring multizone pressure, said sheet extending facing the whole of said area, said sheet comprising means, not shown, for connection to an electronic system for measuring the pressure exerted by an occupant of said padding at various zones of said area, said sheet comprising:
  - a flexible support layer,
  - a first electrode 8 comprising a plurality of first current-conduction lines 9, each of said lines having a first end forming a first contact element 10—here in the form of a circular flat pellet,
  - a second electrode 11 overlapping said first electrode, said second electrode comprising a plurality of second current-conduction lines 12, each of said lines having a second end forming a second contact element 13—here in the form of a circular flat pellet—, each first element 10 being disposed facing a respective second element 13,
  - a plurality of intermediate contact elements 14—here in the form of circular flat pellets—having piezoresistive properties, each of said intermediate elements being inserted between a respective first 10 and second 13 element so as to form a plurality of pressure sensors 15 formed by the stack of said contact elements, said sensors being distributed over said support layer in a discrete manner,
- an elastically compressible stuffing block 16, especially made from foam, said padding furthermore having the following features:
- said support layer is made of mesh,
- said first electrode is made from conductive ink printed on said support layer,
- said second electrode is made from printed conductive ink,
- said intermediate contact elements are made from printed conductive ink.

According to the embodiment shown, the cover 2 comprises:
- an external cladding layer 4, for example made from fabric or leather,
- a middle comfort layer 5 made from foam,
- an internal layer 6 made from a mesh forming the support layer.

According to the embodiment shown, the second lines 12 are spaced apart from the first lines 9, so as to avoid any electrical contact between the two, the contact between the electrodes 8, 11 taking place through the intermediate contact elements 14.

According to the embodiment shown:
- the intermediate contact elements 14 are printed on the first contact elements 10,
- the second electrode 11 is printed on the internal layer 6 and on said intermediate elements.

In a variant embodiment that is not shown:
- the second electrode 11 is printed on an additional layer made from mesh, not shown, disposed towards the stuffing block 16, said layer being glued to the internal layer 6,
- the intermediate contact elements 14 are printed as required on the first 10 or second 13 contact elements.

The fact that the additional layer is made from mesh makes it possible, as in the case of the internal layer 6, not to impair the comfort of the padding 1.

According to one embodiment, the internal layer 6:
- comprises between 6 and 10 columns of threads/cm and between 5 and 10 rows of threads/cm,
- has a mass per surface area of between 25 and 50 g/m$^2$,
- is formed from threads the count of which is between 40 and 120 dtex.

This thus gives a sufficiently dense meshing that makes it possible for the ink not to be substantially absorbed in the thickness of the internal layer 6, which makes it possible to have a reliable electrical circuit.

According to various embodiments, the internal 6 and/or additional layer is made from polyester or polyamide.

According to one embodiment, the cover 2 is fitted on the stuffing block 16.

In a variant embodiment, the cover 2 is at least partly overmoulded by the stuffing block 16, said block being based on moulded foam.

According to one embodiment, at least one conductive ink comprises a matrix based on polyurethane.

According to the embodiment shown, the sheet 7 further comprises at least one impervious and electrically insulating protective layer 17.

According to the embodiment shown, the protective layer 17 is disposed on the same side as the stuffing block 16.

According to an embodiment that is not shown, the protective layer 17 is disposed opposite to the block 16, so as to protect the electrodes 8, 11 and the contact elements 14 from fluids accidentally spilt on the padding 1.

According to another embodiment that is not shown, the sheet 7 comprises two protective layers 17, the electrodes 8, 11 and the contact elements 14 being housed between the two.

Provision can in particular be made for at least one protective layer 17 to be based on printed ink.

Provision may in particular be made for a protective layer 17 to be printed directly on the support layer, the first electrode 8 then being printed on said support layer by means of said protective layer.

In a variant, at least one protective layer 17 may be based on varnish or polymer gel.

According to one embodiment, the ink of the electrodes 8, 11 is provided with conductive particles comprising a metal such as silver.

According to one embodiment, the ink of the intermediate contact elements 14 comprises conductive particles based on carbon or silica.

According to one embodiment, the inks of the electrodes 8, 11 and of the intermediate contact elements 14 are deposited in a thickness of between 0.1 and 1.5 mm.

According to one embodiment, the thickness of the middle layer 5 is between 1.5 and 5 mm and the density thereof is in particular between 0.025 and 0.045, so as not to interfere with the detection of an occupant of the padding 1.

What is claimed is:

1. A padding for a motor vehicle seat, the padding comprising:
    a cover upholstering the padding, the cover having an area for receiving a passenger,
    a sheet for measuring multizone pressure, the sheet extending facing the whole of the area, the sheet comprising means for connection to an electronic system for measuring the pressure exerted by an occupant of the padding at various zones of the area, the sheet comprising:
    a flexible support layer,
    a first electrode comprising a plurality of first current-conduction lines, each of the first current-conduction lines having a first end forming a first contact element,
    a second electrode overlapping the first electrode, the second electrode comprising a plurality of second current-conduction lines, each of the second current-conduction lines having a second end forming a second contact element,
    each first element being disposed facing a respective second element,
    a plurality of intermediate contact elements having piezoresistive properties, each of the intermediate elements being inserted between a respective first and second element to form a plurality of pressure sensors formed by a stack of the contact elements, the sensors being distributed over the support layer,
    an elastically compressible stuffing block,
    and wherein,
    the support layer is made of mesh,
    the first electrode is made from conductive ink printed on the support layer,
    the second electrode is made from printed conductive ink,
    the intermediate contact elements are made from printed conductive ink with less conductivity than that of the inks of the first and second electrodes.

2. The padding according to claim 1, wherein the cover comprises:
    an external cladding layer,
    a middle comfort layer made from foam,
    an internal layer made from a mesh forming the support layer.

3. The padding according to claim 2, wherein:
    the intermediate contact elements are printed on the first contact elements, and
    the second electrode is printed on the internal layer and on the intermediate elements.

4. The padding according to claim 2, wherein:
    the second electrode is printed on an additional layer made from mesh disposed towards the stuffing block, the additional layer being glued to the internal layer, and
    the intermediate contact elements are printed as required on the first or second contact elements.

5. The padding according to claim 2, wherein the internal layer:
    comprises between 6 and 10 columns of threads/cm and between 5 and 10 rows of threads/cm,
    has a mass per surface area of between 25 and 50 g/m$^2$, and
    is formed from threads the count of which is between 40 and 120 dtex.

6. The padding according to claim 1, wherein the cover is fitted on the stuffing block.

7. The padding according to claim 1, wherein the cover is at least partly overmoulded by the stuffing block, the block being made of moulded foam.

8. The padding according to claim 1, wherein the sheet further comprises at least one impervious and electrically insulating protective layer.

* * * * *